No. 664,944. Patented Jan. 1, 1901.
J. GREER.
COMBINED LIQUID MEASURE AND REGISTER.
(Application filed Nov. 13, 1899.)
(No Model.)

Witnesses,
S. M. Neff
Grace Mytinger

Inventor,
Joseph Greer,
By
Attorney.

UNITED STATES PATENT OFFICE.

JOSEPH GREER, OF DENVER, COLORADO.

COMBINED LIQUID MEASURE AND REGISTER.

SPECIFICATION forming part of Letters Patent No. 664,944, dated January 1, 1901.

Application filed November 13, 1899. Serial No. 736,795. (No model.)

*To all whom it may concern:*

Be it known that I, JOSEPH GREER, a citizen of the United States of America, residing at Denver, in the county of Arapahoe and State of Colorado, have invented certain new and useful Improvements in a Combined Liquid Measure and Register; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in a combined liquid measure and register; and it consists of the features hereinafter described and claimed, all of which will be fully understood by reference to the accompanying drawings, in which is illustrated an embodiment thereof.

Figure 4:
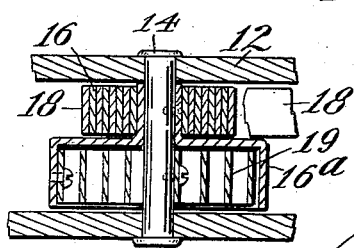
Figure 3:
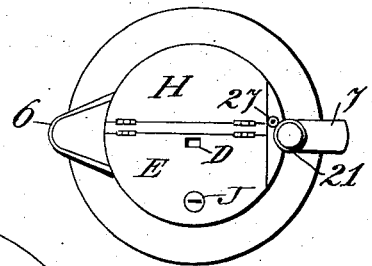
Figure 2:
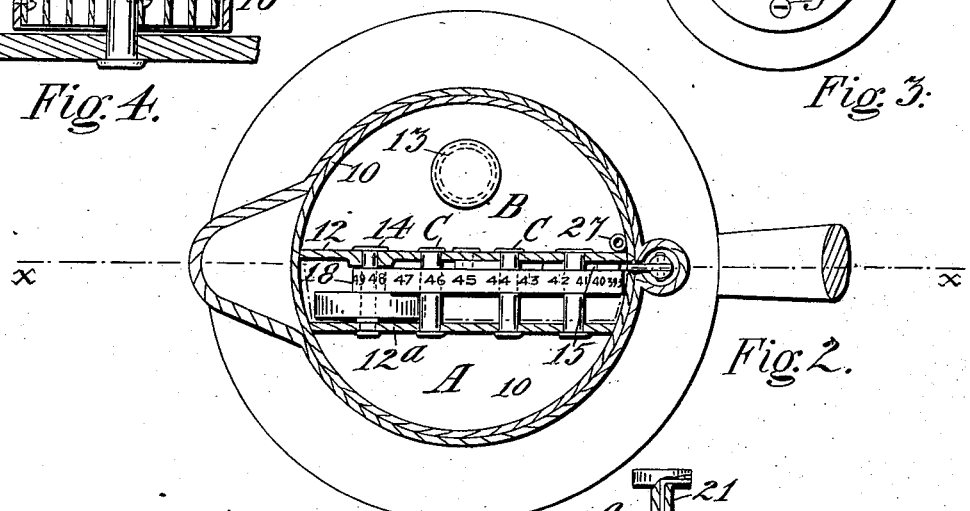
Figure 1:
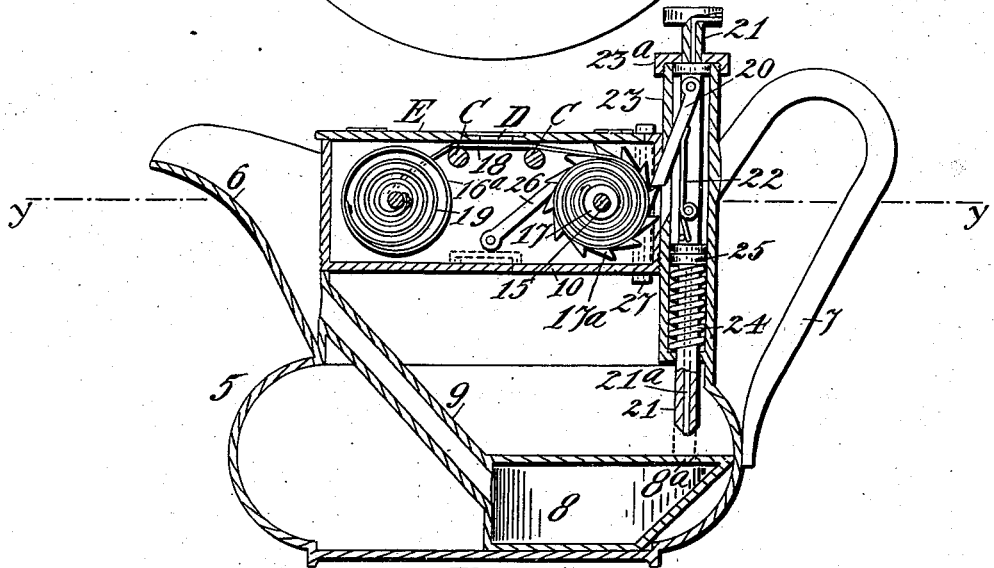

In the drawings, Figure 1 is a vertical section taken through my improved device on the line X X, Fig. 2. Fig. 2 is a horizontal section taken on the line Y Y, Fig. 1. Fig. 3 is a top view of the device shown on a smaller scale. Fig. 4 is a section taken through the spring-actuated winding-spool, the parts being shown on a larger scale.

Similar reference characters indicating corresponding parts in the views, let the numeral 5 designate a pitcher or other suitable receptacle from which liquid may be poured. This pitcher is provided with a mouth 6 and a handle 7. In its bottom is located an auxiliary receptacle or measure 8, adapted to hold the quantity of liquid it is desired to pour out at one time. This measure 8 communicates with the mouth of the pitcher by a tube or passage 9. In the top of the measure is an opening $8^a$, through which the liquid from the pitcher may pass to fill the measure. In the upper part of the pitcher is inserted a casing 10, which is screwed thereinto, whereby it may be detached at pleasure. This casing is divided by a partition 12 into two compartments A and B. The bottom of the compartment B is provided with an opening normally closed by a suitable cap or stopper 13. By opening this stopper the pitcher may be filled with liquid. In the compartment A is located the registering mechanism, which will now be described.

In the partition 12 and an auxiliary partition $12^a$ are mounted two spindles 14 and 15, carrying spools 16 and 17, upon which a tape 18, containing suitable numbers, is adapted to wind. The spool 16 is provided with a drum $16^a$, inclosing a spring 19, one extremity of which is attached to the stationary spindle 14, while the other extremity is attached to the drum. One extremity of the tape 18 is attached to the spool 16 and the other extremity to the spool 17. The spool 17 is provided with ratchet-teeth $17^a$, arranged to be engaged by a dog 20, mounted on a plunger 21 and held in operative position by a spring 22, also mounted on the plunger. The plunger 21 is inclosed by a tube 23, whose bottom is open to allow the plunger to pass into the pitcher directly above the opening $8^a$ of the measure 8. The plunger is surrounded by a coil-spring 24, whose lower extremity engages the bottom of the tube and whose upper extremity engages a shoulder 25, formed on the plunger. The tube 23 and the casing 10 are open on one side to allow the dog 20 to engage the ratchet-teeth $17^a$. Upon the partition 12 is pivotally mounted a gravity locking-dog 26, which also engages the teeth $17^a$. The pitcher is provided with a vent-tube 27 to allow the liquid to flow freely into the opening $8^a$. The plunger is provided with a vent-duct $21^a$ to allow air to enter the measure 8 as the liquid is poured therefrom.

When it is desired to pour liquid from the pitcher, the plunger 21 is forced downward by the pressure of the thumb thereon until its lower extremity closes the opening $8^a$ of the measure 8, thus preventing the liquid from entering the measure from the pitcher as it is escaping from the tube 9. As the plunger is moved downward the dog 20 engages the ratchet-teeth $17^a$ of the spool 17, turns the spool 17, and draws the tape from the spool 16 sufficiently to register or indicate that one measure full has been poured from the pitcher. The pitcher is then tipped sufficiently to allow the liquid in the measure to run out. As soon as the measure is emptied the plunger is released and automatically returned by its spring 24 to its normal or raised position, allowing the liquid to flow from the pitcher into the receptacle 8, which is again filled, after which the same operation may be repeated until the liquid in the pitcher has been exhausted by pouring out a measure full at a time.

This pitcher may be used in saloons for pouring out drinks and wherever it is desired to pour out liquid in predetermined specific quantities.

Upon the partitions 12 and 12ª are mounted two rollers C, which guide the tape as it moves from one spool to the other. When beginning the use of the pitcher, the tape is all wound on the spool 16. After it has been all drawn from the spool 16 and wound on the spool 17 in the manner heretofore described it may be automatically returned to the spool 16 by unscrewing the cap 23ª from the tube 23, raising the plunger to bring the dog 20 out of the path of the ratchet-teeth 17ª, and lifting the dog 26 from engagement with the ratchet-teeth 17ª, after which the recoil of the spring 19 will reverse the movement of the spool 16, returning the tape to its normal position. The numbers on the tape may be observed from the outside through the glass-covered opening D, formed in the cover part E, which closes the compartment A and is normally locked to prevent access thereto by any one, except the person holding the key to the lock J. (See Fig. 3.) A lid H, closing the compartment B, may be opened at any time for the purpose of refilling the pitcher by way of the opening closed by the cap 13.

Having thus described my invention, what I claim is—

1. A liquid measure and register comprising a main receptacle, an upper compartment separated from the main liquid-containing compartment, registering mechanism located in the said upper compartment, a lid adapted to conceal said mechanism, an auxiliary receptacle in the bottom of the main receptacle and provided with a pouring-outlet and an inlet communicating with the main receptacle, and a plunger adapted when actuated to simultaneously close said inlet and actuate the registering mechanism.

2. A liquid measure and register comprising a main receptacle provided with a casing inserted in the top thereof and provided with two compartments, registering mechanism located in one compartment, a lid adapted to conceal the said mechanism, an auxiliary receptacle located in the bottom of the main receptacle and provided with a pouring-outlet and an inlet communicating with the main receptacle, and a plunger adapted when actuated to simultaneously close said inlet and actuate the registering mechanism.

In testimony whereof I affix my signature in presence of two witnesses.

JOSEPH GREER.

Witnesses:
A. J. O'BRIEN,
GRACE MYTINGER.